UNITED STATES PATENT OFFICE.

CHARLES D. FULLER, OF KALAMAZOO, MICHIGAN.

PROCESS OF PREPARING BEANS.

SPECIFICATION forming part of Letters Patent No. 669,726, dated March 12, 1901.

Application filed July 9, 1898. Serial No. 685,524. (No specimens.)

*To all whom it may concern:*

Be it known that I, CHARLES D. FULLER, a citizen of the United States, residing at the city of Kalamazoo, in the county of Kalamazoo and State of Michigan, have invented a certain new and useful Improved Process of Preparing Beans, of which the following is a specification.

This invention relates particularly to an improved process for preparing beans for use as food.

Heretofore the usual method of preparing beans has been to cook them whole, retaining in this manner the hulls or skins. This is the prime cause of indigestion and flatulency from eating such food. I am aware, however, that beans have been made into a special product by removing their hulls or skins and cooking the kernels and shredding or crushing the same and then drying the mass. The product thus produced, however, is not desirable, as it invites germ and insect life, and it is only possible to preserve it in tightly-sealed packages. It is only possible to utilize this substance for soups or puree or in a specially-prepared mush or mass not altogether desirable.

It is the object of my invention to eliminate the hull, skin, or outer covering from beans, and thus prepare the kernels for use in such manner that they can be preserved indefinitely and be capable of preparation in any well-known form or manner, thus not requiring special recipes that practically result in new dishes.

With my improved product baked beans, stewed beans, soup, and puree are all equally available.

I accomplish these objects of my invention by the means described in this specification, and the invention is pointed out in the claims.

The first step of my improved process consists in soaking the dry beans. This is done, preferably, by placing them in a cold-water vat or tank. I am aware, however, that hot water would hasten the process and that the same step might be effected by a steam-bath; but the addition of heat greatly increases the expense and more or less injures the keeping quality of the kernel, as it is difficult to prevent its cooking the same somewhat, which decides me in favor of the cold-water vat or tank. This soaking loosens the hull, which takes up the water quite rapidly, so that it becomes more or less wrinkled over the entire outer surface of the bean. When the skin has become soaked through to the inside, it can be easily separated from the interior by rubbing, which I effect by a suitable machine for the purpose. When this is done and the hulls loosened from the beans, they are passed into a further tank of water, which serves to separate and float the skins or hulls, by the difference in their gravity, from the remaining portions of the beans. I do not wish to confine myself to this means of separation, though it has an advantage in that the water tends to further dissolve the offensive alkaloids and other deleterious substances in the kernel of the bean. Then after a short treatment I remove the beans from the water-bath and place them in suitable drying-ovens or spread them out so they will dry in the air, or I dry them by means of any suitable drier, when they are prepared as a finished product and ready for consumption.

The treatment which the beans receive in nearly every instance splits them open, so that the water of the second bath has opportunity to act very thoroughly upon the entire kernel of the bean. The beans thus prepared can be cooked nearly as quickly as potatoes by boiling and when used in soup quickly disintegrate and pass through the entire body of the soup, giving it a more or less creamy consistency, depending on the quantity used, and imparting to the same a very delicate flavor.

Having thus described my invention, what I claim as new, and desire to secure by Letters Patent, is—

1. The herein-described process of treating beans to produce a new food product, consisting of, first, soaking the same until the hulls or skins become loosened from the interior without materially softening the kernel; second, removing the hulls from the kernels of the bean by subjecting them to rubbing and pressure to rupture the hulls and force the kernels out, and separating the kernels from the hulls; third, passing the kernels through a suitable drying process to enable their preservation, so that they retain all of the original possibilities of preparation that any raw bean does.

2. The herein-described process of treating beans to produce a new food product, consisting of, first, soaking the same until the hulls or skins become wrinkled or loosened from the interior without materially softening the kernel; second, removing the hulls from the kernels of the beans by subjecting them to rubbing and pressure to rupture the hulls and force the kernels out, and separating the kernels from the hulls.

In witness whereof I have hereunto set my hand and seal in the presence of two witnesses.

CHARLES D. FULLER. [L. S.]

Witnesses:
   OTIS A. EARL,
   LELA M. BROWN.